3,287,222
METHOD FOR PREPARATION OF SYNTHETIC FIBER MEDICAL DRESSING IMPREGNATED WITH THERAPEUTIC
Raymond Larde, Coubron, and Andre Queuille, Noisy-le-Sec, France, assignors to Roussel-UCLAF, S.A., Paris, France, a corporation of France
No Drawing. Filed Mar. 12, 1963, Ser. No. 264,712
Claims priority, application France, Mar. 16, 1962, 891,342
8 Claims. (Cl. 167—84)

The invention relates to novel medicinal dressings of synthetic fibers containing therapeutic agents therein and to novel process of preparing the said medicinal dressings.

Fibers of natural origin, such as wool, silk, cotton or ramie retain water or aqueous solutions either by capillary action or swelling of the fibers. Because of this fact, textiles prepared from natural fibers swell in water and retain a substantial quantity of water therein. When these natural fibers are used for medicinal dressings, this water retention activity causes the dressing to adhere to the wound and new cellular growth is destroyed or torn away each time the dressing is changed thereby delaying the healing of the wound.

Synthetic fibers, such as polyvinyl chloride fibers will absorb only very small amounts of water and, therefore, textiles prepared from these fibers will retain only a little water on the surface of the fibers by adsorption or by interposition in the mesh of the textile. Therefore, textiles of synthetic fibers will return to their original natural weight after drying in an atmosphere of constant humidity for several minutes. This hydrophobic property of synthetic textiles is called "negative capillarity."

Synthetic textiles have recently been used for medical dressings, bandages and operative fields. Due to the hydrophobic properties of the synthetic fibers, they do not adhere to wounds, such as burns and can be easily removed without damaging new cellular growth. However, this hydrophobic property of synthetic fibers also makes it extremely difficult to apply any therapeutic agents to the dressings to help the healing of the wound to which it is applied. Until now, there has not been any economical commercial method to add therapeutic agents to synthetic dressings.

An object of the invention is to provide novel synthetic medical dressings containing therapeutic agents therein.

Another object of the invention is to provide a novel process for preparing synthetic medical dressings with a constant amount of a therapeutic agent in an economical manner.

These and other objects and advantages of the invention will become obvious from the following detailed description.

The novel process of the invention for preparing synthetic medical dressings impregnated with a therapeutic agent comprises impregnating the synthetic medical dressing with a solution or suspension of the therapeutic agent, a thickening agent and a plasticizing agent in an inert solvent, draining the excess liquid from the dressing and drying the synthetic medical dressing with a therapeutic agent therein. The medical dressing can be sterilized after the addition of the therapeutic agent or before the addition of the therapeutic agent but in the latter instance the addition of the said agent is effected under sterile conditions.

Examples of suitable thickening agents are alkyl celluloses, such as methyl cellulose, hydroxyethyl cellulose, carobxyethyl cellulose, esters of cellulosic derivatives and similar products.

Examples of suitable plasticizing agents are glycols, polyols, polymers of ethylene oxide or propylene oxide whose free hydroxyl groups may be esterified or etherified or combined with sorbitan, fatty acids, polymers of vinyl alcohol, polyvinyl pyrrolidone and polyvinyl alcohol sold under the trade name "Rhodoviol."

Examples of suitable therapeutic agents which can be incorporated into the synthetic medical dressing are antibiotics, such as framycetin, penicillin, gramicidin, polymixin and chloramphenicol, alone or in association with anti-inflammatory agents; cortisonic steroids which may or may not be water-soluble, such as hydrocortisone, prednisolone and m-sulfobenzoate of dexamethasone; antiseptics, such as sulfamides, methylene blue dye, gentian violet and derivatives of acridine; organomercurial derivatives, such as mercurochrome; and local anesthetics, such as stovaine, novacaine, butocaine and lidocaine.

The therapeautic agent is preferably dissolved or suspended in water and then added to a solution of the thickening agent and the plasticizing agent and the resulting suspension or solution is thoroughly homogenized, particularly in the case of polymorphic substances whose crystalline form may be modified in water. The thickening agent makes the application of the film to the mesh of the medical dressing easier and the plasticizing agent makes the solution more adherent to the dressing and makes the dressing less friable after drying.

One mode of the process of the invention comprises washing the precut medical dressing with water, sterilizing the washed dressing, impregnating the sterile synthetic dressing with a sterile solution or supsension of the therapeutic agent, thickening agent and plasticizing agent prepared aseptically or sterilized by heating, immersion, aspersion, pulverization or nebulization, draining the excess liquid from the impregnated dressing, air drying and then drying in a sterile atmosphere.

Another mode of the process of the invention comprises impregnating the non-sterile synthetic medical dressing with a non-sterile solution or suspension of the therapeutic agent, thickening agent and plasticizing agent, draining the excess liquid from the dressing, air drying in a sterile atmosphere and sterilizing the synthetic medical dressing containing the therapeutic agent.

The synthetic dressing, particularly vinyl chloride (15%)-vinylidene chloride (85%) copolymer, polyethyleneglycol terephthalate, polyvinyl chloride dressings, may be sterilized by any chemical or physical means except heating. Examples of suitable sterilizing means are contact with liquid or gaseous, organic or inorganic antiseptic and exposure to physical agents, such as ultra-violet rays, X-rays, soft or penetrating $\beta$-rays or $\gamma$-rays.

The synthetic medical dressings of the invention containing a therapeutic agent therein may be colored or colorless but all exhibit a diaphanous, very fine film when held to the light, the said film which is flexible and adheres to the dressing being derived from the non-aqueous fraction of the solution or suspension containing the therapeutic agent. The dressings may be in any form, such as squares, rectangles, etc., depending upon the desired use.

The synthetic medical dressings containing therein a therapeutic agent may be used in animal or human therapy. They permit the treatment of wounds, burns or suppurations in the best conditions of antisepsis and of healing. The dressings are designed for direct application to wounds or burns and if desired can be covered with a layer of cotton or gauze to absorb the exudates.

The sterile synthetic dressings impregnated with the therapeutic agent are usually packed in sterile flexible plastic envelopes, such as low pressure polyethylene which can be easily sealed with a heated press. If desired, the envelope may also be interleaved with an aluminum or other suitable leaf.

The term synthetic medical dressing is intended to include any medical bandage, operative fields or other medical objects made of fibers of a synthetic material, such as polyvinyl chloride, vinyl chloride (15%)-vinylidene chloride (85%) copolymer, polyethyleneglycol terephthalate.

In the following examples there are described several preferred embodiments to illustrate the invention. However, it should be understood that the invention is not intended to be limited to the specific embodiments.

EXAMPLE I

*Application of framycetin to polyvinyl chloride gauze*

1.8 gm. of methyl cellulose was dissolved in 60 cc. of distilled water and the solution was carefully homogenized. 10 gm. of polyethylene glycol 300 were then added to the said solution and after complete dissolution the resulting limpid solution was filtered and sterilized by heating to 120° C. for one hour in an autoclave.

A sterile solution of framycetin was prepared by dissolving 1 gm. of sterilized framycetin sulfate in 25 cc. of distilled sterile water. After complete dissolution, the solution was added to the concentrated methyl cellulose solution. The walls of the vessel containing the sterile solution of framycetin were rinsed with several cc. of sterile distilled water and the rinse water was then added to the solution. After careful homogenization, the final volume of the solution was adjusted to exactly 100 cc. All the said operations were performed in a closed room having a sterile atmosphere and under ultraviolet radiation of germicidal lamps.

10 cm. x 10 cm. polyvinyl chloride bandages were washed several times with distilled water, drained and sterilized by ultraviolet radiation. The polyvinyl chloride bandages were then rolled individually and immersed one after another into the framyectin solution in a previously sterilized plastic or stainless steel vat. After soaking in the solution for several seconds, the polyvinyl chloride gauze bandages were removed from the vat, unrolled, allowed to drain and then dried flat.

The polyvinyl chloride gauze contained framycetin which could be seen as a thin, homogeneous translucid film when held to the light. Each bandage containsd 4 gm. of the framycetin solution per 100 cm.$^2$ of bandage which contained 30 mg. of framycetin. The polyvinyl chloride gauze bandage could also be impregnated in a continuous fashion and then be cut into pieces of desired size after drying. The impregnated squares of polyvinyl chloride bandages can be placed in flexible envelopes made of low pressure polyethylene (5/100 mm. of thickness) or other suitable plastic previously sterilized with heat or ethylene oxide vapors. If desired, the envelopes can be interleaved with a leaf of aluminum foil. The envelopes were then sealed with a heating press to give a fully protected package of the impregnated gauze bandage which can be handled without fear of contamination.

EXAMPLE II

*Application of hydrocortisone to polyvinyl chloride gauze*

An aqueous sterilized homogenized suspension of hydrocortisone was prepared and added to a concentrated solution of methyl cellulose in water prepared as in Example I. The final volume of the suspension was brought to 100 cc. after the addition of rinse waters and contained 250 mg. of hydrocortisone per 100 cc. of suspension.

10 cm. x 10 cm. squares of polyvinyl chloride gauze were soaked in the said suspension, drained and dried as in Example I to obtain polyvinyl chloride gauze bandages containing 10 mgm. of hydrocortisone per 100 cm.$^2$ of bandage.

EXAMPLE III

*Application of the sodium salt of metasulfobenzoate of dexamethasone to polyvinyl chloride gauze*

25 mgm. of the sodium salt of metasulfobenzoate of dexamethasone were dissolved in 25 cc. of sterile distilled water. The said solution and the rinse waters were added to a concentrated aqueous solution of methyl cellulose prepared as in Example I and the total volume of the mixed solutions was brought to exactly 100 cc. by the addition of sterile distilled water.

10 cm. x 10 cm. squares of polyvinyl chloride gauze were soaked in the said solution, drained and dried as in Example I to obtain polyvinyl chloride bandages containing 1 mgm. of the sodium salt of metasulfobenzoate of dexamethasone per 100 cm.$^2$ of bandage.

EXAMPLE IV

In place of the methyl cellulose solution prepared in Example I, one of the following solutions can be employed:

(a)

| | | |
|---|---|---|
| Methyl cellulose | gm | 0.90 |
| Rhodoviol | gm | 2.225 |
| Glycerol | cc | 10.00 |
| Distilled water, q.s.p. 100.00 cc. | | |

(b)

| | | |
|---|---|---|
| Carboxymethyl cellulose | gm | 1.60 |
| Glycerol | cc | 20.00 |
| Distilled water, q.s.p. 100.00 cc. | | |

(c)

| | | |
|---|---|---|
| Hydroxyethyl cellulose | gm | 1.80 |
| Polyethylene glycol 300 | cc | 10.00 |
| Distilled water, q.s.p. 100.00 cc. | | |

(d)

| | | |
|---|---|---|
| Methyl cellulose | gm | 2.04 |
| Cetomacrogol 1000 | gm | 2.00 |
| Polyethylene glycol | cc | 30.00 |
| Distilled water, q.s.p. 100.00 cc. | | |

(e)

| | Gram |
|---|---|
| Carboxymethyl cellulose | 1.00 |
| Hydroxyethyl cellulose | 1.00 |
| Distilled water, q.s.p. 100.00 cc. | |

(f)

| | | |
|---|---|---|
| Polyethylene glycol 400 | cc | 10.00 |
| Methylcellulose | gm | 0.90 |
| Polyvinyl pyrrolidone in 10% solution | cc | 45.00 |
| Distilled water, q.s.p. 100.00 cc. | | |

(g)

| | Grams |
|---|---|
| Methyl cellulose | 2.94 |
| Cetomacrogol 1000 | 2.00 |
| Distilled water, q.s.p. 100.00 cc. | |

(h)

| | | |
|---|---|---|
| Methyl cellulose | gm | 2.1 |
| Propylene glycol | cc | 30.00 |
| Distilled water, q.s.p. 100.00 cc. | | |

(i)

| | Cc. |
|---|---|
| Polyethylene glycol 300 | 20 to 40 |
| Polyethylene glycol 1540 | 60 to 80 |

Rhodoviol is the trademark for polyvinyl alcohol obtained by alcoholysis of polyvinyl acetate. Cetomacrogol 1000 is the commercial name for the monocetyl ether of polyethylene glycol 1000.

Various modifications of the process of the invention may be made without departing from the spirit or scope thereof and it is to be understood that the invention is to be limited only as defined in the appended claims.

We claim:

1. A process for the preparation of a synthetic hydrophobic fiber medical dressing impregnated with a therapeutic agent which comprises impregnating the synthetic hydrophobic fiber medical dressing with an inert solvent containing the therapeutic agent, a thickening agent and a plasticizing agent, draining the excess liquid from the synthetic hydrophobic fiber medical dressing and drying the synthetic hydrophobic fiber medical dressing impregnated with the therapeutic agent.

2. The process of claim 1 wherein the inert solvent is water.

3. The process of claim 1 wherein the plasticizing agent is selected from the group consisting of glycols and polyalkylene oxides and esters thereof, polyvinyl alcohol and polyvinyl pyrrolidone.

4. A process for the preparation of a polyvinyl chloride fiber medical dressing impregnated with a therapeutic agent which comprises impregnating polyvinyl chloride fiber medical dressing with water containing the therapeutic agent, a thickening agent and a plasticizing agent, draining the excess liquid from the dressings and drying the latter to obtain polyvinyl chloride fiber medical dressing impregnated with the therapeutic agent.

5. A process for the preparation of a polyvinyl chloride fiber medical dressing impregnated with a therapeutic agent which comprises sterilizing polyvinyl chloride fiber medical dressing, impregnating the sterile medical dressing with sterile water containing the therapeutic agent, a thickening agent and a plasticizing agent, draining the excess liquid from the dressing and drying the latter under sterile conditions to obtain sterile polyvinyl chloride fiber medical dressing impregnated with the therapeutic agent.

6. A process for the preparations of a polyvinyl chloride fiber medical dressing impregnated with a therapeutic agent which cmprises impregnating polyvinyl chloride fiber medical dressing with water containing a therapeutic agent, a thickening agent and a plasticizing agent, draining the excess liquid from the medical dressing, drying the said dressing and sterilizing the dried dressing to obtain sterile polyvinyl chloride fiber medical dressing impregnated with a therapeutic agent.

7. A medical dressing impregnated with a therapeutic agent produced by the process of claim 1.

8. A polyvinyl chloride fiber medical dressing impregnated with a therapeutic agent produced by the process of claim 4.

References Cited by the Examiner

UNITED STATES PATENTS

| | | | |
|---|---|---|---|
| 2,571,849 | 10/1951 | Elson | 167—84 |
| 2,804,073 | 8/1957 | Gallienne et al. | 167—84 |
| 2,824,559 | 2/1958 | Sullivan et al. | 167—84 |
| 3,052,237 | 9/1962 | Chand | 128—156 |
| 3,077,882 | 2/1963 | Trewella | 128—156 |
| 3,122,479 | 2/1964 | Smith | 167—84 |
| 3,132,984 | 5/1964 | Davies | 128—156 X |
| 3,200,035 | 8/1965 | Martin | 167—38.6 |

OTHER REFERENCES

J. Soc. Dyers & Colourists, vol. 69, No. 11, November 1953, page 473.

JULIAN S. LEVITT, *Primary Examiner.*

FRANK CACCIAPAGLIA, Jr., *Examiner.*

G. A. MENTIS, *Assistant Examiner.*